United States Patent [19]

Longuemare, Jr.

[11] 4,387,373
[45] Jun. 7, 1983

[54] SYNTHETIC MONOPULSE RADAR

[75] Inventor: R. Noel Longuemare, Jr., Ellicott City, Md.

[73] Assignee: Westinghouse Electric Corp., Pittsburgh, Pa.

[21] Appl. No.: 789,486

[22] Filed: Apr. 21, 1977

[51] Int. Cl.³ .............................................. G01S 13/44
[52] U.S. Cl. .............................. 343/5 CM; 343/16 M
[58] Field of Search ......................... 343/5 CM, 16 M

[56] References Cited

U.S. PATENT DOCUMENTS

| | | | |
|---|---|---|---|
| 3,976,998 | 8/1976 | Voles et al. | 343/5 CM |
| 3,993,994 | 11/1976 | Goggins | 343/5 CM |
| 4,034,370 | 7/1977 | Mims | 343/5 CM |
| 4,134,113 | 1/1979 | Powell | 343/5 CM |
| 4,155,086 | 5/1979 | Blair | 343/5 CM X |
| 4,168,500 | 9/1979 | Brassaw | 343/5 CM X |
| 4,168,501 | 9/1979 | Brassaw | 343/5 CM X |
| 4,204,210 | 5/1980 | Hose | 343/5 CM X |

Primary Examiner—T. H. Tubbesing
Attorney, Agent, or Firm—W. E. Zitelli

[57] ABSTRACT

A synthetic aperture radar in which echo returns received at sampling points over the length of the synthetic aperture are stored and correlated to form an image of the reflecting surface. The echo returns taken at sampling points over the first half of the synthetic aperture length are integrated to form a first synthetic monopulse beam, the echo returns taken from sampling points over the second half of the synthetic aperture length are integrated to form a second synthetic monopulse beam, and the first and second synthetic monopulse beams are linearly combined to provide synthetic monopulse sum and difference signals suitable for performing various beam sharpening functions in accordance with techniques in use with sum and difference signals provided by conventional monopulse antennas.

14 Claims, 7 Drawing Figures

SYNTHETIC MONOPULSE RADAR

BACKGROUND OF THE INVENTION

1. Field of the Invention

The present invention relates to synthetic aperture radars and, more particularly, to a synthetic aperture radar which synthesizes a monopulse antenna beam pattern.

2. Description of the Prior Art

In a conventional monopulse radar system employing a physical monopulse antenna to detect the angular deviation of a target from a boresight axis, the boresight is the electrical axis of the antenna or the angular location of a signal source within the antenna beam at which the angle error detector outputs go through zero. In a conventional monopulse antenna, several antenna beams are simultaneously produced from a single pulse and a characteristic of these beams is compared to eliminate the effect of time variance of the echo signal. Amplitude monopulse radar systems are well known in the art in which the beam produced by a first aperture of the monopulse antenna is boresighted at a small angle in relation to a beam simultaneously produced through a second aperture of the monopulse antenna. The target is detected in relation to an amplitude difference between the returns of the two beams. Phase monopulse radar systems are also well known in the art in which the beam produced by a first aperture is boresighted in parallel relation to a beam simultaneously produced by a second aperture. In this case, the target is detected in relation to a phase difference between the returns of the parallel beams. By the use of additional apertures, both amplitude and phase monopulse systems can be adapted to detect errors in both azimuth and elevation. Also, both can be implemented with reflectors fed from a point source, a line source, or a source of some other configuration.

As described above, the conventional monopulse radar systems sense target displacement by comparing the amplitude or phase of the echo signal received in each of the antenna elements, such as microwave horns. This comparison includes the use of microwave hybrids to subtract the signal returns received by pairs of antenna apertures to provide a signal output when the target is off the boresight axis. The RF circuitry for a conventional monopulse antenna subtracts the return at an element to the left of the boresight axis from the return at an element to the right of the boresight axis to sense deviation from the boresight axis in the azimuth direction. The typical RF circuitry for a two dimensional monopulse antenna also subtracts the return at an element above the boresight axis from the return at an element below the boresight axis to sense deviation from the boresight axis in the elevation direction. These microwave hybrid outputs are referred to as difference signals, which are zero when the target is on the boresight axis and which increase in magnitude with increasing displacement of the target from the boresight axis. Also in accordance with the above description, difference signal reflected from point targets on opposite sides of the boresight axis will be of a different sense. The comparison of the echo signal received in each of the antenna elements further includes the use of microwave hybrids to add the signal returns of the antenna elements to provide a maximum signal output when the target is on the boresight axis. The RF circuitry for a conventional monopulse antenna adds the return at an element to the left of the boresight axis to the return at an element to the right of the boresight axis. The typical RF circuitry for a two dimensional monopulse antenna also adds the returns at elements above and below the boresight axis. These microwave hybrid outputs which are referred to as sum signals, decrease in magnitude with increasing displacement from the boresight axis. The sum signal provides a reference signal to allow angle error detection circuitry to use the difference signal to determine the angular deviation of the targets from the boresight axis.

In conventional monopulse systems, various beam sharpening techniques have been used for many years to obtain improvement over the angular resolution limitations inherent in the beamwidth available with real aperture antennas. Various types of beam sharpening are possible using the sum and difference signals. In one technique, known as monopulse resolution improvement (hereafter sometimes referred to as MRI), the difference channel signal is adjusted in gain and is noncoherently subtracted from the sum channel signal to provide various degrees of sharpening depending upon the gain ratio, null depth, signal-to-noise ratio and other IF signal characteristics. Another technique, described here as azimuth stabilization, exploits the well known off-boresight monopulse error signal obtained by phase detecting the difference signal with the sum signal. By algebraically adding this error signal at the proper scale factor to the deflection voltage of the radar display, a vernier angle correction signal is available to correctly concentrate the signal returns from the point target at the correct spot on the display, thereby sharpening the beamwidth by improving the definition of the displayed returns.

As used with a conventional monopulse antenna, however, such beam sharpening schemes require a complex monopulse antenna with sum and difference channels and, in most cases, phase and amplitude balanced receiver channels. Against single point targets with high signal-to-noise ratios, beam sharpening factors on the order of thirty to one or more are possible over that of the basic sum channel beamwidth. Resolution improvement, however, is limited to approximately two-to-one for two or more point targets in the same resolution cell of the monopulse antenna pattern.

As a consequence of the resolution limitations experienced with conventional monopulse antennas, there has been a continuing effort to develop radar systems which are suitable for high resolution applications such as ground-mapping and air reconnaissance. Subsequent to the development of pulse-compression techniques which provided significant improvement in the range resolution of conventional radar systems, synthetic aperture radar techniques were developed for improving the angular resolution of a radar system to a significantly finer value than the angular resolution directly achievable with a radiated beamwidth from a conventional antenna of comparable dimensions. Therefore, the prior art, synthetic aperture radar techniques have been used in applications requiring substantial sharpening ratios of the real beamwidth.

The operation of a synthetic aperture radar is somewhat analogous to the operation of linear array antennas which are old in the art. A linear array antenna is a physically large antenna that is comprised of a long array of antenna elements, each of which have a relatively small aperture. The radiating elements are positioned at sampling points along a straight line and transmission signals simultaneously fed to each element of the array. The elements interconnected such that simultaneously received return signals are vectorially added to exploit the interference between the signals received by the various elements. The linear array antenna provides an effective illumination pattern that is equivalent to the illumination pattern of a single element multiplied by an array factor. The product of the single element illumination pattern and the array factor results in an effective antenna pattern having significantly sharper lobes than the antenna pattern of any single element.

Synthetic aperture radar systems are based upon the synthesis of an effectively long antenna array by signal processing means rather than by the use of a physically long antenna array. With a synthetic aperture radar, it is possible to generate a synthetic array many times longer than any physically large antenna that could be conveniently transported such that the resultant antenna beamwidth is many times narrower than the beamwidth which is attainable for a conventional radar having an antenna of comparable dimensions. Due to their synthesis of an antenna array which is much larger than the actual aperture of the physical antenna, radars using this technique have been characterized as synthetic aperture radars. In the most common synthetic aperture case, a single radiating element is used which is translated to take up sequential sampling positions along a straight line. At each of these sampling positions, a signal is transmitted and the amplitude and the phase of the radar signals received in response to that transmission are stored. After the radiating element has traversed a distance substantially equivalent to the length of the synthetic array, the signals in storage are somewhat analogous to the signals that would have been received by the elements of the conventional linear array. Accordingly, the signals in storage are subjected to substantially the same integration operation as used in forming the antenna pattern of a conventional linear array. That is, they are added vectorially. As a consequence of the non-coherent transmission from the elements of the synthetic aperture, the resolution of a synthetic aperture radar is substantially the same as could be achieved with the use of an antenna array which was twice as long as the synthetic array length. As is well known to those skilled in the art, the highest resolution achievable for a synthetic aperture radar is one-half the aperture of the physical antenna with a fundamental limit placed on the achievable resolution as a consequence of the requirement that the real beamwidth continuously illuminate the area within the synthetic array length, in combination with the inverse relationship of the real beamwidth and the aperture of the physical antenna.

Although significant improvements in angular resolution have been made through the use of synthetic aperture radars, it was also recognized that a synthetic aperture radar with further improved angular resolution capabilities would also be useful. A minimum synthetic aperture radar is capable of generating a map imagery at the average information rate of the number of resolution cells across the range extent of the map times the rate that resolution cells are encountered across the azimuth dimension of the map. However, the imagery is somewhat equivalent to a non-coherent sidelook radar which receives only a single return pulse each time the aircraft moves one beamwidth. This type of imagery is referred to as single look and has a rather coarse or grainy texture when viewed closely. Also, this imagery is subject to scintillation effects of specular echo returns which tend to obfuscate targets in close proximity. The image quality can be improved by increasing the processing rate so that additional looks are processed and combined after detection. However, the additional looks must be statistically independent, which, in the prior art, required additional processing memory as well as an increased processing rate. Generally, prior art synthetic aperture radar (SAR) systems having multilook capability have increased the amount of hardware roughly in proportion to the number of looks unless mapping performance was sacrificed since resolution can always be traded for more looks. There was, therefore, also a need for an SAR system having multilook capability which could preserve the single look resolution of the system during operation in a multilook mode without requiring substantially more hardware. That is, there was a need for an SAR system which could obtain the benefits of non-coherent integration of statistically independent looks at the target without requiring a substantial amount of additional hardware and without sacrificing the achievable resolution.

The prior art SAR systems having a high degree of resolution required a significant coherent integration time in the correlation of the stored signals. It was known that if the integration time could be reduced, certain of the motion compensation requirements of the SAR system could be relaxed resulting in a less demanding mechanization of the motion compensation apparatus for a given degree of radar platform acceleration. There was also, therefore, a need for reducing the integration time of the SAR correlator while maintaining the resolution of the SAR system to relax the requirements on the motion compensation apparatus.

SUMMARY OF THE INVENTION

In accordance with the present invention, a synthetic aperture radar propagates electromagnetic waves and samples the returns from these propagated waves at a number of points across the aperture of an antenna which is being synthesized. The sampled returns are stored and the sampled returns from a first portion of the synthetic aperture are vectorially combined to comprise a first synthetic antenna sub-beam and the returns sampled over a second portion of the synthetic aperture are vectorially combined to form a second synthetic antenna sub-beam. The first and second synthetic antenna sub-beams are then linearly combined to form sum and difference synthetic monopulse signals from which the functions available with real aperture monopulse antennas can be performed.

DESCRIPTION OF THE PREFERRED EMBODIMENT

Figure 1:
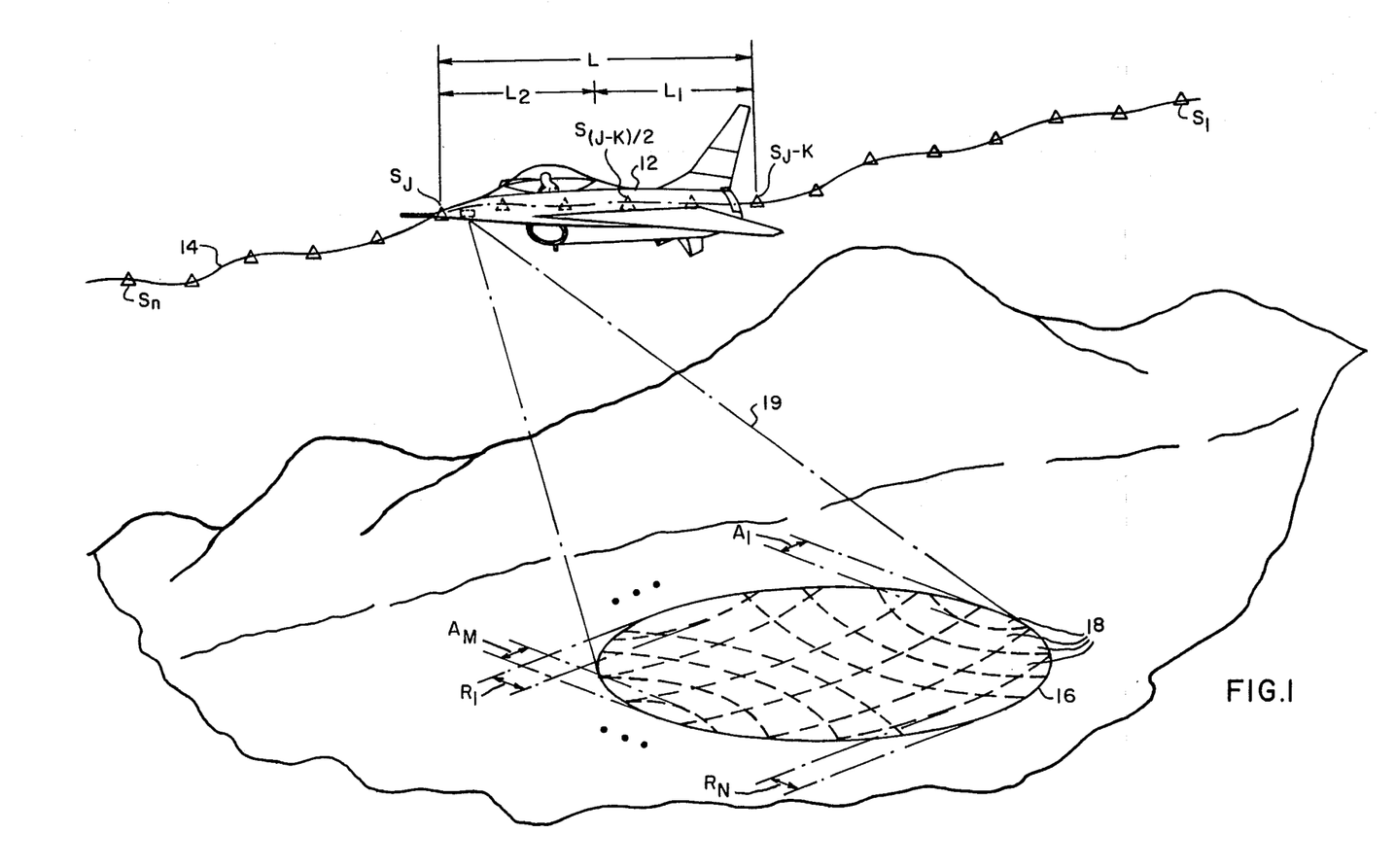
FIG. 1 illustrates the operation of a synthetic aperture radar carried aboard an aircraft that is performing a mapping function.

FIG. 1 illustrates the application of a synthetic aperture radar system (hereafter sometimes referred to as an SAR system) in a typical strip-line ground mapping operation. The synthetic aperture radar is carried aboard an aircraft 12 which is traversing a flight path 14 that is substantially parallel to a strip of terrain 16 which is being mapped. It will be noted that the flight path 14 is not truly linear but that, as a result of perturbations of the aircraft 12, it contains certain contours which have been exaggerated in FIG. 1 for the purposes of illustration. The SAR reproduces the image of the map strip 16 to a resolution determined by the size of resolution cells 18. The resolution cells 18 illuminated by the radar beam 19 are arranged in M number of parallel columns located at various angles from the aircraft 12, and N number of parallel rows located at various ranges from the aircraft. That is, each of the M parallel columns of resolution cells 18 within the radar beam 19 are further comprised of N resolution cells 18 so that the map strip 16 within the radar beam 19 is defined by N×M number of resolution cells 18 whose range dimensions are indicated as $R_1$ through $R_N$ and whose angular dimensions are indicated as $A_1$ through $A_M$. To obtain a high resolution and, therefore, a more precise image of the map strip 16, the resolution cells 18 should be as physically small as possible. The reduction of the range dimension (R) of the resolution cells 18 is accomplished by pulse compression techniques which are not particularly unique to synthetic aperture radars and, since they are unnecessary to an understanding of the present invention, are not hereafter referred to. The limitation of the angular dimension (A) of the resolution cells 18 is the object of a typical SAR system and will be hereafter more fully described in relation to FIG. 2.

In accordance with the typical operation of an SAR system as illustrated in FIG. 1, the synthetic aperture radar aboard the aircraft 12 includes a conventional radar antenna (shown in FIG. 2) of relatively small physical dimensions. As the aircraft 12 moves along the flight path 14, the antenna is translated to take up sequential sampling point positions $S_1$ through $S_n$ parallel to the map strip 16. When the radar antenna is at sampling point $S_1$, the radar transmits a pulse that causes the radar antenna 22 to propagate the illumination beam similar to that illustrated in FIG. 1 as being bounded by the dashed lines 19. Thereafter, the antenna receives an echo of the transmitted signal and the amplitude and phase of this signal are preserved in a memory device. Likewise, when the radar antenna is at sampling point $S_2$, the radar transmits a second pulse and receives a second reflected echo signal which is also stored in the memory device. The achievable image resolution depends primarily upon the length of the aperture that is synthesized. Therefore, the sampling process continues until the motion of the aircraft has carried the radar antenna 22 across a sufficient number of sampling points to compose a synthetic aperture of adequate length to achieve the desired resolution. Since the resolution cells 18 must be continuously illuminated for all sampling points between the ends of the synthetic array, the synthetic length can be no longer than the diameter of the area illuminated by the real antenna beamwidth if the orientation of the antenna is fixed with respect to the aircraft. In FIG. 1, the diameter of the real beamwidth 19 is illustrated as being K sampling points in length so that a synthetic array up to twelve sampling points in length can be constructed. In FIG. 1, the translation of the radar antenna along the flight path 14 and the transmission of radar pulses at sampling points $S_1$ through $S_n$ along the flight path is somewhat analogous to placing a sequence of radiating elements at the sampling points along the flight path 14.

After the antenna has traversed K number of sampling points, the signals stored in the memory device are somewhat similar to the signals that would have been received by the elements of a conventional linear array antenna arranged along the flight path 14 of the aircraft 12. More precisely, the return signals for a synthetic aperture system are inherently capable of a higher resolution than a conventional linear array because in the synthetic array a signal is both transmitted and received from a particular sampling point while in the conventional linear array all the elements receive returns of the same reflected signal. The consequence of this is that there is a two-way phase shift in the reflected signal for each sampling point in a synthetic aperture while there is only one-way phase shift between echoes received by different elements of a conventional array so that the phase difference in a signal from a given target as observed at two different sampling points of a synthetic array is twice as great as the phase difference in signals observed at two different elements in a linear array. Therefore, the synthetic aperture radar inherently has twice the resolution of a conventional linear array of comparable length.

As was known in the prior art, the vectorial combination of return echoes from the transmitted pulses by the integration of the returns from K sampling points of the synthetic aperture length over the time period necessary for the radar antenna to traverse the K number of sampling points will cause the effective cancellation between echoes having a substantially different phase. As is well known in the art, the resultant combination of echoes provides an effective antenna pattern having angular resolution comparable to that obtainable from a linear array radar antenna having a physical length substantially equal to twice the distance traversed by the aircraft 12 over the integration period. In accordance with the teachings of the prior art, for the illustration of FIG. 1, K number of the stored echo returns from sampling points $S_{J-K}$ through $S_J$ would vectorially be combined by integrating K number of returns over the time required by the aircraft 12 to traverse the synthetic aperture length L which includes the sampling points $S_{J-K}$ through $S_J$.

In accordance with the present invention, and as distinguished from the SAR systems of the prior art, the disclosed SAR system performs the vectorial combination of the stored echo returns sampled over a predetermined portion of the synthetic aperture length to provide a first synthetic antenna beam and performs the vectorial combination of the stored echo returns sampled over a second portion of the synthetic aperture length to provide a second synthetic antenna beam. These independently synthesized beams are then combined to provide synthetic monopulse sum and difference signals as further explained in relation to FIG. 2. In the illustration of FIG. 1, and in accordance with the SAR system of the present invention, K/2 number of the stored echo returns from sampling points $S_K$ through $S_{(J-K)/2}$ are vectorially combined by integrating these returns over the time required by the aircraft 12 to traverse $L_1$, one-half of the synthetic length L which includes the K/2 sampling points to provide the first synthetic antenna beam. Similarly, the K/2 number of stored echo returns from the sampling points $S_{(J-K)/2}$ through $S_J$ which comprise the other half $L_2$ of the synthetic aperture L, are vectorially combined by integrating these returns over the time required by the aircraft 12 to traverse sampling points $S_{(J-K)/2}$ through $S_J$ to provide the second synthetic antenna beam. Therefore, in the specific example of the preferred embodiment, one predetermined portion of the synthetic aperture length is chosen to be the one-half of the synthetic aperture antenna $L_1$ correlative to the sampling points $S_K$ through $S_{(J-K)/2}$, and the other predetermined portion of the synthetic aperture antenna is the remaining one-half of the synthetic aperture length $L_2$ correlative to the sampling points $S_{(J-K)/2}$ through $S_J$. As more particularly described in relation to FIG. 2, the first beam formed from the vectorial combination of the returns from the sampling points $S_K$ through $S_{(J-K)/2}$ is combined with the second beam formed from the vectorial combination of the returns from the sampling points $S_{(J-K)/2}$ through $S_J$ to provide first and second beams from which synthetic monopulse sum and difference signals may be produced in accordance with conventional monopulse techniques.

Figure 2:
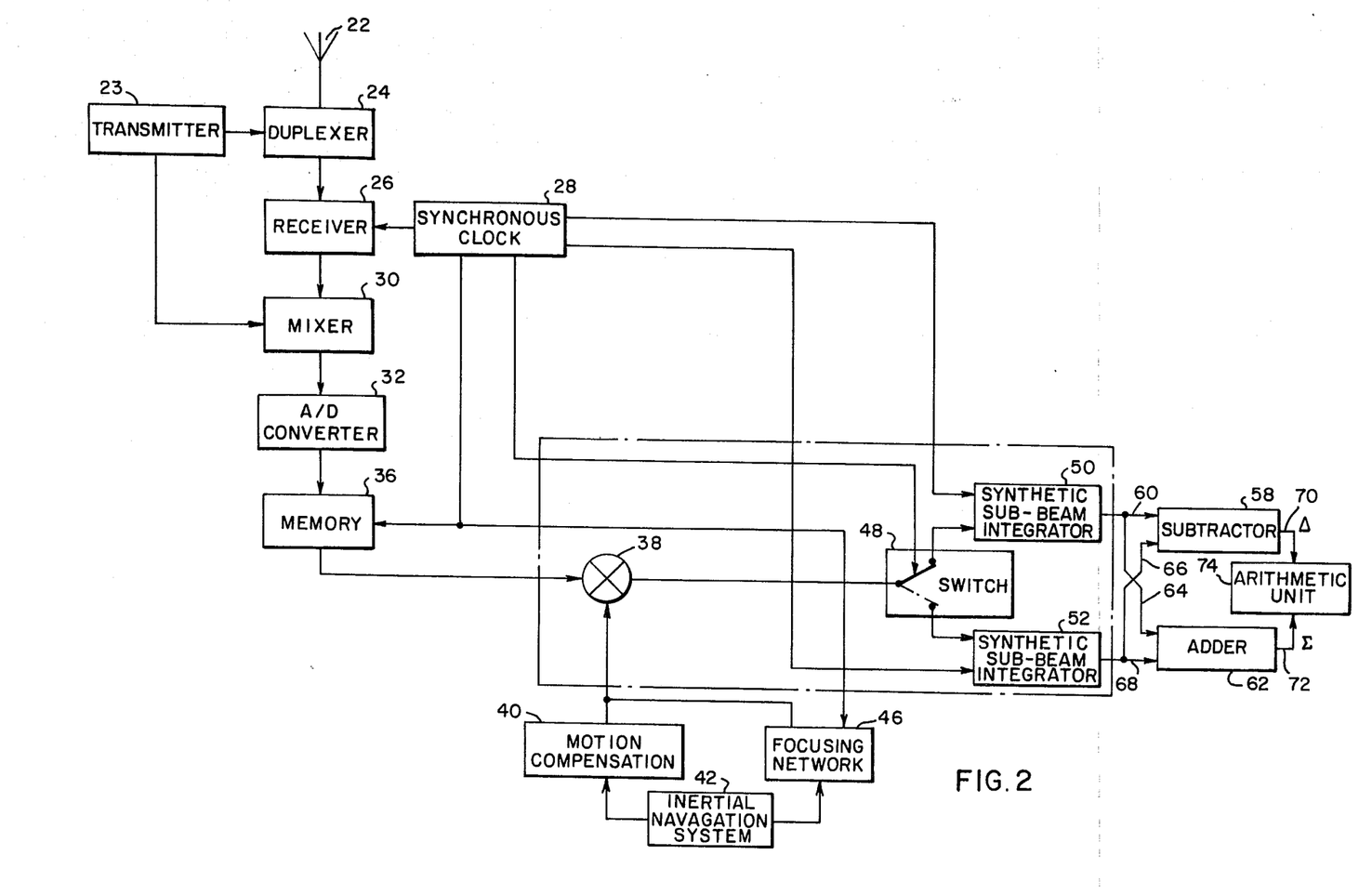
FIG. 2 is a block diagram of a preferred embodiment of the synthetic monopulse radar of the present invention.

FIG. 2 shows a block diagram of the synthetic monopulse radar which is carried aboard the vehicle 12 of FIG. 1 and illustrates the disclosed synthetic monopulse radar in greater detail. The synthetic monopulse radar of FIG. 2 includes a transmitter 23 which supplies a transmission pulse to a conventional antenna 22 through a duplexer 24 to cause the antenna 22 to propagate the microwave energy of the illumination beam 19 toward the map strip 16 (FIG. 1). The antenna 22 also collects return echoes of the propagated transmission signal and operates through the duplexer 24 to provide received echo signals to the receiver 26. The receiver 26 samples the echo signals received by the antenna 22 in response to a timing signal from a synchronous clock 28 and provides these sampled signals to a mixer 30 which is also responsive to the transmitter 23. The mixer 30 operates to provide intermediate frequency signals (sometimes hereafter referred to as IF signals) to an analog-to-digital converter 32 (hereafter sometimes referred to as the A/D converter 32). The output of the A/D converter 32 is provided to a memory 36 in which the information is stored to await further processing. In response to a timing signal from the synchronous clock 28, the information stored in the memory 36 is provided to a multiplier 38 which is also responsive to a motion compensation signal provided by a motion compensation network 40 which, in turn, is responsive to the output of an inertial navigation system 42. The multiplier 38 is also responsive to a focusing network 46 that is likewise responsive to the outputs of the inertial navigation system 42. As well known in the art of synthetic aperture radars, the motion compensation network 40 multiplies the output of the memory 36 in the multiplier 38 to provide motion compensation for the SAR radar system, and the focusing network 46 references the output of the memory 36 in the multiplier 38 to focus the SAR image by adjusting the slope of the correlation timebandwidth reference signal. The motion compensated and focused output of the multiplier 36 is provided to an electronic switch 48 which operates to controllably connect the output of the multiplier 38 between a first synthetic sub-beam integrator 50 and a second synthetic sub-beam integrator 52 in response to a control signal provided by the synchronous clock 28. The output of the synthetic sub-beam integrator 50, in response to the synchronous clock 28 provides an output on line 60 to a subtracter 58 and provides another output on line 64 to an adder 62. Similarly, the synthetic sub-beam integrator 52, which is also responsive to an output of the synchronous clock 28, provides an output on line 66 to the subtracter 58 and provides another output on line 68 to the adder 62. The subtracter 58 provides a monopulse difference signal on line 70 and the adder 62 provides a monopulse sum signal on line 72. The monopulse difference signal and the monopulse sum signal are provided to an arithmetic unit 74 which utilizes the sum and difference signals in accordance with conventional monopulse antenna techniques which are more particularly described in relation to FIGS. 4, 5, 6 and 7.

The block diagram of FIG. 2, which illustrates the synthetic monopulse radar that is carried aboard the vehicle 12 of FIG. 1, is capable of finer resolution than is inherent in prior art synthetic aperture radars having resolution cells 18 of given R and A dimensions. In the operation of the preferred embodiment of FIG. 2, the antenna 22 transmits the illumination pattern 19 (FIG. 1) in response to the illumination signal of the transmitter 23 provided through the duplexer 24. The echo returns of the illumination pattern are collected by the antenna 22 and detected by the receiver 26. The echo signals detected by the receiver 26 are down-converted to representative IF signals in the mixer 30 by mixing the echo signals of the receiver 26 with the transmit signal of the transmitter 23. The IF signals represent the doppler frequency of the angular positions of the synthetic aperture. The IF signals are then converted from analog to digital form in the analog-to-digital converter 32 and the digitized IF signals are provided to the memory 36. The A/D converter 32 operates a rate commensurate with the bandwidth of the SAR system, and resolves the echo returns into individual range cells; the range dimension (R) of the range cells being approximately the range resolution of the system. The digitized coherent return signals are then provided to the memory 36.

The memory 36 stores the output signals of the A/D converter 32 which are provided during the time in which the aircraft 12 (FIG. 1) traverses the sampling points $S_K$ through $S_{J-K}$, which distance, in the example of FIG. 1, is equivalent to the length of the synthetic aperture. Since the phase and amplitude of each output of the A/D converter 32 must be preserved, two pieces of data must be recorded for each resolution cell 18. Thus, a three-dimensional matrix of information words is compiled in the memory 36. The successive entries in a dimension of the memory 36, which is arbitrarily defined as the X dimension, are range words since the echo from each sampling point of FIG. 1 is sorted into range cells by the A/D converter 32. The successive entries in a dimension perpendicular to the X dimension, which is defined to be the Y dimension, cooperate to represent the amplitude of the range word for each X coordinate. The successive entries in a Z dimension, which is perpendicular to the plane formed by the X and Y dimensions, represents the angular position of the echo returns within the synthetic aperture. Once the information from the A/D converter 32 is stored in the memory 36 it can be correlated to provide an image of high resolution.

A correlator includes the multiplier 38, the switch 48, and the synthetic sub-beam integrators 50 and 52. As can be seen from the vehicle flight path 14 shown in FIG. 1, in-flight perturbations of the aircraft 12 create contours in the vehicle flight path 14 which may vary the range of the SAR platform in relation to the map strip 16 and which, consequently, vary the velocity of the SAR platform relative to the map strip 16. The velocity between the SAR platform and the map strip 16 imposes a doppler frequency on the phase of the echo returns which are received and placed in storage in the memory 36 by the SAR system. Since, as more fully described hereinafter, the stored signals are integrated to effect a cancellation of echoes whose phase indicates that they are reflected from points off-center of the radar beam, the superimposed doppler frequency will create errors in the integrated result. The multiplier 38 compensates for these phase errors in response to a reference signal provided by the motion compensation network 40 in relation to the velocity determined by the inertial navigation system 42. The inertial navigation system 42 is comprised of a conventional inertial navigation system that includes stabilized rate gyros mounted on an inertial platform, and the motion compensation network 40 is a conventional motion compensation network which provides phase reference signals to the multiplier 38 in response to the motion determined from the inertial investigation system data to control the phase offset provided by the multiplier 38. The disclosed SAR system therefore compensates for motion of the synthetic aperture radar by using the inertial navigation system 42 to derive components of motion and, in response to these motion components, uses the motion compensation network 40 to modify the phase of echo signal data stored in the memory 36.

The correlation process for resolving image elements from sampled return signals includes the comparison of the motion compensated return signals with a focus reference signal provided by the focusing network 46 to the multiplier 38 to focus the output signal of the memory 36. Since the difference in doppler frequency with respect to angular position provides the basis for image angular resolution, the integration of the doppler frequency time history describes the phase shift that must be applied by the focusing network 46 over the coherent integration time of the correlator 76 to focus the image of the synthetic aperture radar. Therefore, the operation of the focusing network 46 includes the generation of a reference signal whose phase shift matches the doppler phase change of the information over the correlation period at the various ranges from each sampling point. That is, to achieve coherent correlation of signals reflected from the various ranges from the sampling points of the synthetic aperture, a phase adjustment must be made for the correlation of each resolution cell to compensate for the different ranges to the target. The range information is provided to the focusing network 46 by the synchronous clock 28 in accordance with the range address of the memory 36. Since uncompensated variations in the velocity of the synthetic aperture radar will distort the focusing of the SAR image, the inertial navigation system 42 computes the velocity of the SAR platform and provides this velocity to the focusing network 46.

The correlator, which also includes the electronic switch 48 and the synthetic sub-beam integrators 50 and 52, operates on the information stored at the range, amplitude, and angular addresses of the memory 36 to form two angular lines of the SAR image. More particularly, to form elements of the image at a particular range location at the central angular location of a first portion of the synthetic aperture, the sampled information contained in the memory 36 for the particular range is correlated for all the angle and amplitude addresses included in the first portion of the synthetic aperture. Similarly, to form an element of the image at a particular range location at the central azimuth location of a second portion of the synthetic aperture, the information contained in the memory 36 for the particular range is correlated for all the angle and amplitude addresses in the second portion of the synthetic aperture. Therefore, in the angular dimension, for each portion of the synthetic aperture, half the correlated information precedes the angular location of the image element angular location. To form another element of the image at the central angular location of a portion of the synthetic aperture but at a different range location, the information contained in the memory 36 for the new range location is similarly correlated for all the angle and amplitude locations. When the correlation of the information of the memory 36 corresponding to a portion of the synthetic aperture is completed for all the ranges of the image, an angular line of the SAR image is completed. Upon completion of an angular line, the information which is the oldest information in the memory 36 is discarded and new information provided by the sampled output of the A/D converter 32 is entered. For the physical example of FIG. 1, the old information being discarded from the memory 36 represents the echo returns from the sampling point $S_K$ which is moving out of the synthetic aperture as the aircraft 12 traverses the flight path 14, and the new information which is being entered into the memory 36 repesents the echo returns from the sampling point $S_{J+1}$, which is moving into the synthetic aperture. In accordance with the above-described operation of the SAR system, each portion of the memory 36 corresponding to a sampling point of the synthetic aperture is filled along its range dimension for each angular dimension location but the memory 36 provides an output along its angular dimension for each range location. Therefore, the memory 36 is what is generally referred to as a corner-turn memory which is familiar to those skilled in the art.

As shown in FIG. 2, the correlation process is accomplished by the multiplication of the echo returns of the memory 36 by motion compensating and focusing reference signals and the integration of product signals within a narrow doppler frequency band established by the bandwidth of the synthetic sub-beam integrators 50 and 52 to resolve the image elements from the memory information representing the doppler frequency of the angular positions of selected portions of the synthetic aperture. The memory 36 stores the sampled echo returns until the antenna 22 has traversed the width of the synthetic aperture so that a synthetic aperture length of information data is stored in the memory 36. Upon a control signal from the synchronous clock 28, the memory 36 serially provides the information data stored from sampling points $S_K$ through $S_{J-K}$ taken for a particular range across the synthetic aperture to the multiplier 38 in which the output information is multiplied by a motion compensation and focusing reference signals from the motion compensation network 40 and the focusing network 46. The output information of the memory 36 is phase corrected in the multiplier 38 in accordance with the motion compensation signal of the motion compensation network 46 to provide motion compensation for the stored information. The focusing reference signal provided by the focusing network 46 adjusts the slope of the doppler frequency of the data that is stored in the memory 36 and motion compensated in the multiplier 38. Therefore, the output of the multiplier 38 comprises the motion compensated, focused information data stored in the memory 36.

In accordance with the present invention, the motion compensated, focused data of the memory 36 is provided by the multiplier 38 to the switch 48 which may be comprised of a digital solid-state logic element. The output of the multiplier 38 is selectively provided to the first and second synthetic sub-beam integrators 50 and 52 through the switch 48 as determined by the position of the switch 48 which is controlled by the synchronous clock 28. While the output of the multiplier 38 represents the echo signals which are correlative to sampling points in the first half of the synthetic aperture, the switch 48 is in the position indicated by the solid line and the motion compensated, focused information data is provided to the synthetic sub-beam integrator 50. While the output of the multiplier 38 represents information samples correlative to the second half of the synthetic aperture, the synchronous clock 28 controls the switch 48 such that the switch 48 is in the position indicated by the dashed line whereby the output of the multiplier 38 is provided to the synthetic sub-beam integrator 52. Therefore, it is shown that the samples collected over the first half of the synthetic aperture are provided to the syntethic sub-beam integrator 50 and the signals collected over the second half of the synthetic aperture are provided to the synthetic sub-beam integrator 52. For the physical example illustrated in FIG. 1, the image elements correlated through the synthetic sub-beam integrator 50 correspond to the echo returns received at the sampling points $S_K$ through $S_{(J-K)/2}$. Similarly, the image elements correlated through the synthetic sub-beam integrator 52 correspond to the echo returns received at the sampling points $S_{(J-K)/2}$ through $S_{J-K}$ of FIG. 1. That is, the correlated output of the synthetic sub-beam integrator 50 corresponds to image elements correlated from sampling points in the first half of the synthetic aperture while the correlated output of the synthetic sub-beam integrator 52 corresponds to image elements from sampling points in the second half of the synthetic aperture. Therefore, the image elements which are correlated through the synthetic sub-beam integrator 52 are analogous to the signal returns from a first horn of a conventional phase monopulse antenna having first and second horns. Likewise, the image elements correlated through the synthetic sub-beam integrator 52 are analogous to the signal returns from the second horn of the conventional monopulse antenna.

After corresponding image elements have been correlated through the sub-beam integrators 50 and 52, the address signal from the synchronous clock 28 causes the sub-beam integrator 50 to provide its image element on lines 60 and 64 to the subtracter 58 and the adder 62 respectively. Simultaneously, the synchronous clock 28 addresses the image element of the sub-beam integrator 52 causing it to provide, in synchronization with the sub-beam integrator 50, its image element on lines 66 and 68 to the subtracter 58 and the adder 62 respectively. In response to the input from the sub-beam integrator 50 on line 60 and the input from the sub-beam integrator 52 on line 66, the subtracter 58 determines the difference in the amplitude of the respective signals and provides a corresponding difference signal to the arithmetic unit 74 on line 70. Conversely, the adder 62, in response to the image element provided by the sub-beam integrator 50 on the line 64 and the corresponding image element from the sub-beam integrator 52 on the line 68, determines the sum of the respective image elements and provides a sum signal to the arithmetic unit 74 on line 72. The arithmetic unit 74 may be comprised of a monopulse resolution improvement circuit hereafter more specifically defined in relation to FIGS. 4 and 5, or may be comprised of an off-boresight error circuit which is more specifically defined in relation to FIGS. 6 and 7.

In accordance with well-known monopulse antenna techniques, the difference signal is composed by determining the difference of a particular row of the array elements in relation to their position with respect to the center of the aperture. point determines the null of the synthetic monopulse antenna so that the amplitude of the return signals integrated for a particular range over a first portion of the synthetic array is subtracted from the amplitude of the return signals integrated for a corresponding range integrated over a second portion of the synthetic array. Therefore, for any return signals identified with a particular range, the sampled signals would be provided to the sub-beam integrators 50 and 52 in the order in which they were sampled. In a similar manner, the sum signal which is provided to the arithmetic unit 74 by the adder 62 on the line 72 is determined by adding the simultaneously occurring image elements provided by the sub-beam integrators 50 and 52.

The difference and sum signals provided on the lines 70 and 72 respectively are substantially equivalent to the difference and sum signals provided by a conventional monopulse antenna and, therefore, may be used in the operations which are available with a conventional monopulse antenna. The availability of both in-phase and quadrature components of the difference and sum signals permits use of quadrature channel gating techniques for distinguishing between point and area targets.

Because the integration is performed in the sub-beam integrators 50 and 52, the discloses synthetic monopulse radar replaces the operations of conventional monopulse antennas and many of the complications of the conventional monopulse system are avoided. For example, only a single microwave (RF), IF, and A/D converter channel is required. Consequently, no delicate phase and gain matching of conventional monopulse antenna channels is needed and no errors from these sources exist in the disclosed system.

Figure 3:
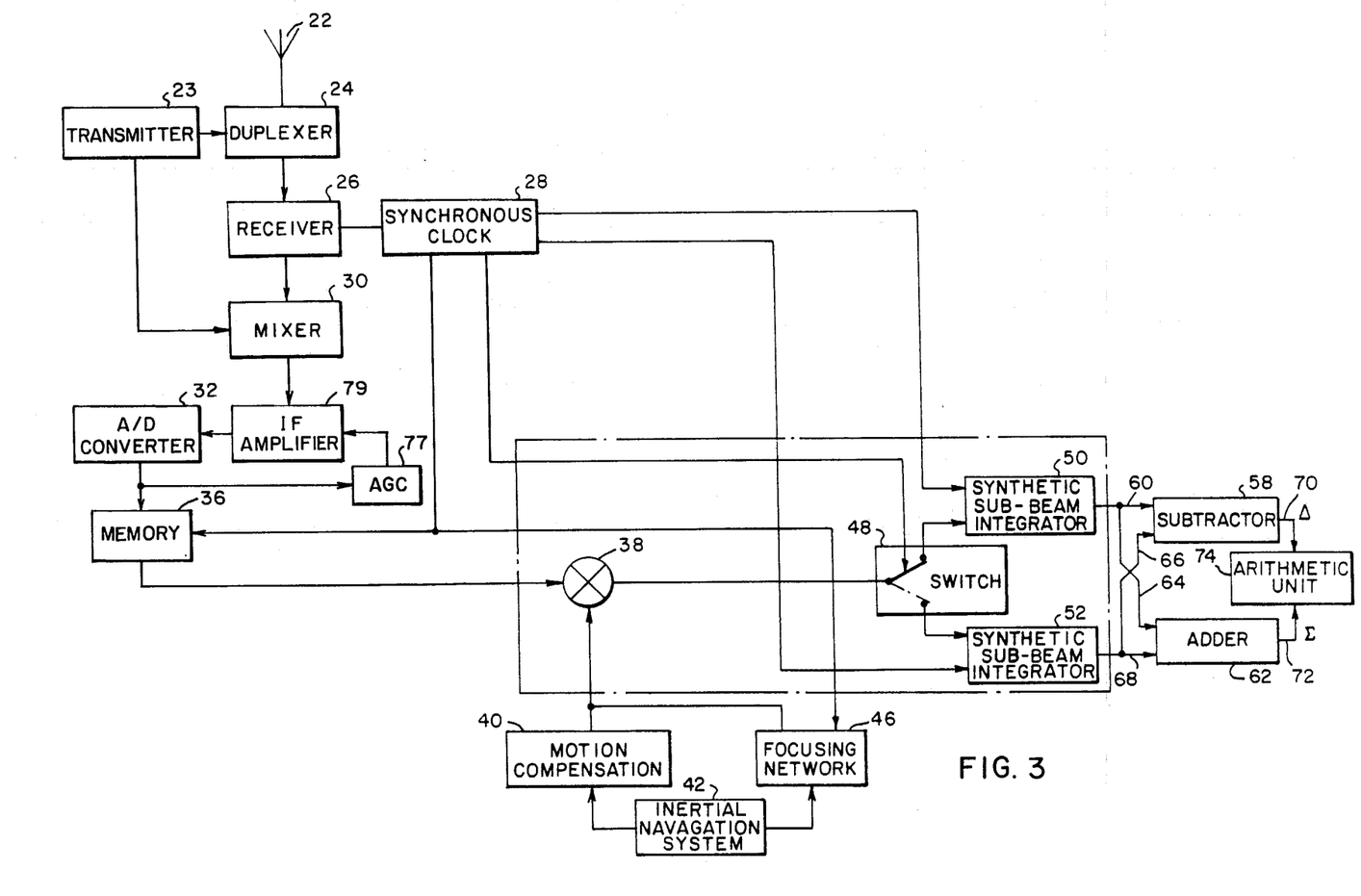
FIG. 3 illustrates an alternative embodiment which incorporates an automatic gain control loop into the embodiment of FIG. 2.

Various functions such as automatic gain control, scaling, or other preprocessing functions can be performed on the data prior to forming the sum and difference signals providing a degree of flexibility not available with the instantaneous signals of the conventional monopulse system. The synthetic monopulse radar which is disclosed herein is shown in FIG. 3 as further including an automatic gain control. The automatic gain control of the synthetic monopulse radar of FIG. 3 includes an automatic gain control 77 which is responsive to the A/D converter 32 and provides gain control to an IF amplifier 79 which is responsive to the mixer 30. In the operation of the automatic gain control monopulse radar of FIG. 3, the IF amplifier 79 amplifies the IF signals provided by the mixer 30 in accordance with a gain control signal provided to the gain control port of the IF amplifier 79 by the automatic gain control 77. The amplitude of the output signal of the A/D converter 32 controls the gain control signal provided by the automatic gain control 77 to the gain control port of the IF amplifier 79 to automatically control the gain of the sum and difference signals.

Figure 4:
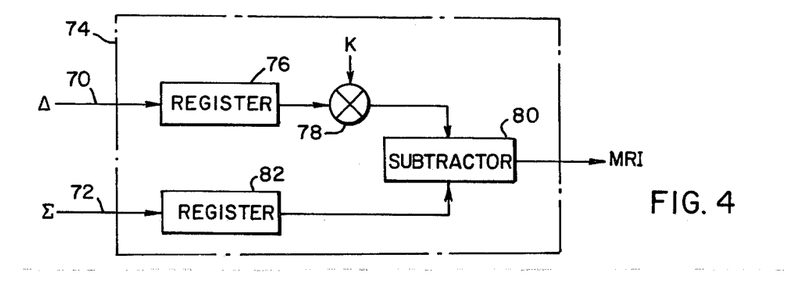
FIG. 4 is a block diagram of the monopulse resolution improvement which is compatible with the synthetic monopulse radar of FIG. 2.

FIG. 4 is a block diagram illustrating a monopulse resolution improvement circuit which performs a monopulse resolution improvement function by manipulation of the sum and difference synthetic monopulse signals. In FIG. 3, the synthetic difference signal on line 70 is provided to a register 76 which removes the sign from the digital number and provides the absolute value of the difference signal to a multiplier 78. The multiplier 78 multiplies the output of the subtracter 76 by a scaling factor (K) and provides this product to a subtracter 80. The synthetic monopulse sum signal on line 72 is provided to a register 82 which removes the sign from the digital value of the sum signal and provides the absolute value of the sum signal to the subtracter 80. The subtracter 80 subtracts the output of the multiplier 78 from the output of the register 82 to provide a monopulse resolution improvement signal (MRI signal). The operation of the monopulse resolution improvement circuit of FIG. 4 and the resolution improvement afforded thereby are described with reference to FIG. 5.

Figure 5:
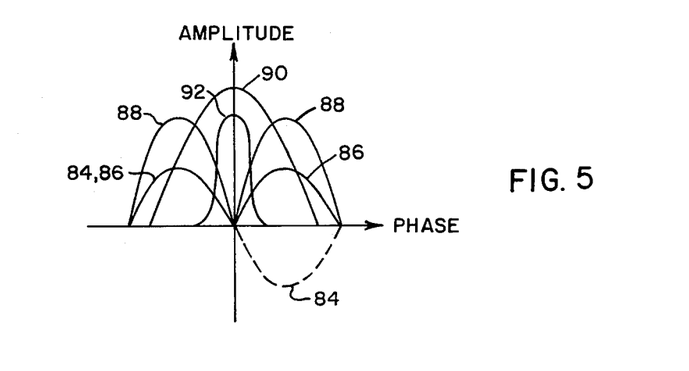
FIG. 5 is a diagram of waveforms which illustrate the operation of the monopulse resolution improvement of the block diagram of FIG. 4.

FIG. 5 represents a plot of the amplitude of the various waveforms occurring in the monopulse resolution improvement circuit as a function of phase angle. The dashed waveform 84 of FIG. 5 represents the difference signal of line 70 applied to the register 76. The register 76 inverts the negative portion of the difference waveform 84 to provide the absolute value of the difference signal illustrated by the waveform 86 of FIG. 5. This waveform 86 is then multiplied by a scaling factor (K) in the multiplier 78 to produce the waveform 88 of FIG. 5. The sum signal provided on line 72 to the register 82 is illustrated in FIG. 5 as waveform 90. The register 82 removes the sign of the digital value of this waveform and provides the absolute value to the subtracter 80. The subtracter 80 subtracts the scaled difference signal illustrated by the waveform 88 from the sum signal illustrated by the waveform 90 to improve the resolution of the beam by synthetically narrowing the beamwidth as shown by the waveform 92 which illustrates the MRI signal which is the output of the subtracter 80.

As an alternative to improving the resolution for a given synthetic aperture, the operation of the disclosed synthetic monopulse radar may be modified to reduce the coherent integration time of the sub-beam integrators 50 and 52 for a given degree of resolution. The shorter integration time can relax certain of the motion compensation requirements of the motion compensation network 40, resulting in a less demanding mechanization for a given degree of lateral platform acceleration.

One example of reducing the coherent integration time is the substitution of a multi-look synthetic monopulse radar having monopulse resolution improvement (MRI) for a single look synthetic aperture radar having high resolution but a longer synthetic antenna length.

For example, in contrast to a conventional synthetic aperture radar having single look resolution of $R_A$ requiring a synthetic array length L and a coherent integration time T, the synthetic monopulse radar with monopulse resolution improvement could maintain the same number of display resolution elements as the conventional synthetic aperture radar but reduce the synthetic antenna length and the integration time by a factor of two. The fundamental limitation for the sampling rate is that the sampling rate must be commensurate with the ultimate resolution. By interpolation between coherent integration cells, the output data samples can be double thereby matching the number of data samples provided to the synthetic monopulse display of the preferred embodiment for each look. Given the MRI improvement of approximately two to one for the synthetic monopulse radar, the synthetic monopulse radar will provide a map of approximately the same fidelity and resolution as the conventional synthetic aperture radar. However, the synthetic monopulse radar requires only one-half the time to form the monopulse resolution improvement samples thereby permitting a second look to be formed for non-coherent addition at the end of the time T. The non-coherent addition of the two independent looks tends to compensate for the suppression effects on closely spaced targets which are inherent in monopulse resolution improvement resulting in comparable resolution $R_A$ and potentially better background level averaging. The shorter integration time of the synthetic monopulse radar with MRI relaxes the systems frequency stability requirements making operation at long ranges more feasible and reducing susceptability to atmosphere anamolies in the signal propagation path.

Figure 6:
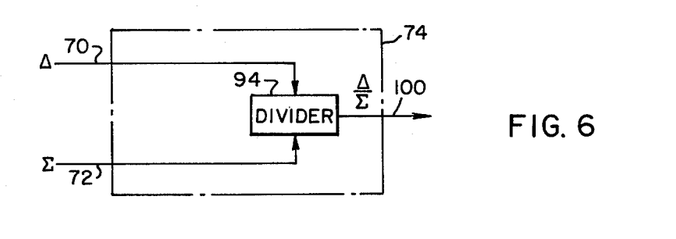
FIG. 6 is a block diagram of an off-boresight error detection device compatible with the synthetic monopulse radar of FIG. 2.
Figure 7:
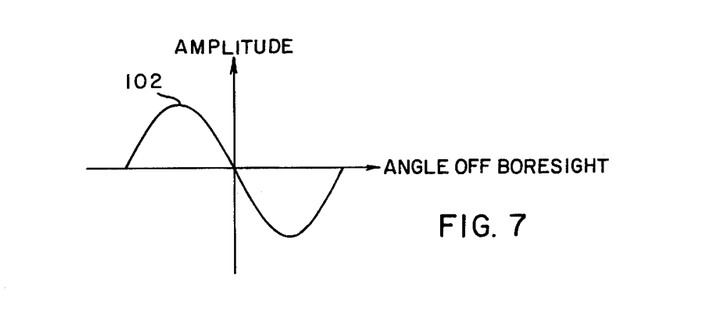
FIG. 7 is a waveform illustrating the operation of the off-boresight error detector of FIG. 6.

Off-boresight angle measurements can be made to further increase the precision of angular measurements by improving the definition of the image displayed. FIG. 6 illustrates a block diagram of the off-boresight error circuit for providing an off-boresight error signal. The difference signal on line 70 and the sum signal on line 72 are provided to a divider 94 which determines the quotient of the difference signal divided by the sum signal. The output of the divider 94 provides the off-boresight error signal on line 100. The amplitude of the off-boresight error signal is illustrated in FIG. 7 by waveform 102 as a function of angle off-boresight.

By algebraically adding the boresight error signal at the proper scale factor to the radar display deflection voltage, a vernier angle correction signal can be provided to correctly concentrate the signal returns at the correct spot on the display, thereby improving the definition of the display.

It will also be appreciated that the disclosed synthetic monopulse technique is not restricted to strip mapping but applies equally well to spot light modes or doppler beam sharpening modes. Neither is the technique limited to airborne radar systems but applies to the general class of synthetic array systems, including stationary radars imaging moving targets and synthetic array sonar systems.

I claim:

1. A synthetic aperture radar for correlating at least two synthetic aperture sub-beams to form an image, said radar comprising:
    first means for integrating the echo returns sampled over a first portion of the synthetic aperture to comprise a first synthetic aperture sub-beam;
    second means for integrating the echo returns sampled over a second portion of the synthetic aperture to comprise a second synthetic aperture sub-beam; and an arithmetic unit that is responsive to the first and second synthetic aperture sub-beams, said arithmetic unit linearly combining the first and second sub-beams to provide sum and difference synthetic monopulse signals.

2. The synthetic aperture radar of claim 1 further comprising:
means for switching the sampled echo returns between said first and second integrating means.

3. The synthetic aperture radar of claim 2 in which the first integrating means integrates the echo returns sampled over a first half of the synthetic aperture, and in which the second integrating means integrates the echo returns over a second half of the synthetic aperture.

4. The synthetic aperture radar of claim 2 further comprising:
means for compensating for the motion of said synthetic aperture radar.

5. The synthetic aperture radar of claim 2 further comprising:
means for weighting the sampled echo returns to focus the image of said synthetic aperture radar.

6. A synthetic aperture radar for providing synthetic monopulse sum and difference signals from backscattered microwave energy sampled over a synthetic aperture, said radar comprising:
first means for integrating the backscattered energy sampled over a first portion of the synthetic aperture to form a first synthetic aperture sub-beam;
second means for integrating the backscattered energy sampled over a second portion of the synthetic aperture to form a second synthetic aperture sub-beam; and
means for combining the sub-beams of said first and second integrating means to provide synthetic monopulse sum and difference signals.

7. The synthetic aperture radar of claim 6 wherein the first integrating means has a first period of integration and the second integrating means has a second period of integration of substantially the same duration as said first period of integration, but which occurs subsequently to said first period of integration.

8. The synthetic aperture radar of claim 7 further comprising:
means for switching the backscattered microwave energy samples between said first and second integrating means.

9. A synthetic aperture radar for providing synthetic monopulse sum and difference signals from backscattered microwave energy sampled over a synthetic aperture, said radar comprising:
first means for integrating the backscattered energy sampled over one-half of the synthetic aperture to form a first synthetic aperture sub-beam;
second means for integrating the backscattered energy sampled over a second half of the synthetic aperture to form a second synthetic aperture sub-beam; and means for combining the synthetic aperture sub-beams of said first and second integrating means to provide synthetic monopulse sum and difference signals.

10. A synthetic aperture radar in which a radar receiver samples backscattered microwave energy of an antenna pattern at points along a synthetic aperture and a memory stores the backscattered energy in a matrix having azimuth and amplitude dimensions, wherein the improvement comprises:
first means for integrating the backscattered energy sampled over a first portion of the synthetic aperture to form a first synthetic aperture sub-beam;
second means for integrating the backscattered energy sampled over a second portion of the synthetic aperture to form a second synthetic aperture sub-beam; and
means for combining the sub-beams of said first and second integrating means to provide synthetic monopulse sum and difference signals.

11. The synthetic aperture radar of claim 10 in which said first integrating means integrates the backscattered energy of sampling points in a first half of the synthetic aperture; and said second integrating means integrates the backscattered energy of sampling points in a second half of the synthetic aperture.

12. A correlator that forms at least two synthetic aperture sub-beams in response to samples of backscattered microwave energy taken over the synthetic aperture of a synthetic aperture radar, said correlator comprising:
a switch that is responsive to the back-scattered energy samples, said switch selectively providing said energy samples to one of first and second outputs;
a first integrator responsive to the first output of the switch to form a first synthetic aperture sub-beam; and
a second integrator responsive to the second output of the switch to form a second synthetic aperture sub-beam.

13. The correlator of claim 12, said correlator being further responsive to motion compensation signals and further comprising:
a multiplier that is connected to the input of the switch, said multiplier being responsive to the motion compensation signals and the backscattered energy samples to compensate for phase shifts in the backscattered energy samples caused by the motion of the synthetic aperture radar relative to the scattering surface.

14. The correlator of claim 12, said correlator being further responsive to focusing signals and further comprising:
a multiplier connected to the input of the switch, said multiplier being responsive to the focusing signals and the backscattered energy samples to compensate for the doppler phase change of the samples over the correlation period.

* * * * *